US010803661B1

(12) United States Patent
Menon et al.

(10) Patent No.: US 10,803,661 B1
(45) Date of Patent: Oct. 13, 2020

(54) ADAPTIVE POLYHEDRA MESH REFINEMENT AND COARSENING

(71) Applicant: Ansys, Inc., Canonsburg, PA (US)

(72) Inventors: Sandeep Menon, Chicago, IL (US); Thomas Gessner, Grantham, NH (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 15/695,216

(22) Filed: Sep. 5, 2017

Related U.S. Application Data

(60) Provisional application No. 62/383,863, filed on Sep. 6, 2016.

(51) Int. Cl.
*G06T 17/20* (2006.01)
*G06F 3/0484* (2013.01)

(52) U.S. Cl.
CPC ........ *G06T 17/205* (2013.01); *G06F 3/04842* (2013.01); *G06T 2210/36* (2013.01)

(58) Field of Classification Search
None
See application file for complete search history.

(56) References Cited

U.S. PATENT DOCUMENTS

| | | | | |
|---|---|---|---|---|
| 5,623,790 A * | 4/1997 | Lalvani | ................... | A63B 9/00 52/79.1 |
| 6,930,682 B1 * | 8/2005 | Livingston | .............. | G06T 17/20 345/420 |
| 2002/0032550 A1 * | 3/2002 | Ward | ...................... | G06F 30/13 703/2 |
| 2002/0120430 A1 * | 8/2002 | Yang | ....................... | G06T 17/20 703/2 |
| 2008/0250309 A1 * | 10/2008 | Moore | ............. | G06F 17/30572 715/227 |
| 2013/0211796 A1 * | 8/2013 | Aquelet | ............. | G06F 17/5018 703/2 |
| 2014/0222395 A1 * | 8/2014 | Hallquist | ................ | G06F 17/10 703/2 |
| 2014/0267261 A1 * | 9/2014 | Samavati | ................ | G06T 17/20 345/423 |
| 2014/0330796 A1 * | 11/2014 | Dally | .................. | G06F 16/1744 707/693 |
| 2015/0113379 A1 * | 4/2015 | Wakefield | ............... | G06T 17/05 715/227 |
| 2015/0120262 A1 * | 4/2015 | Dulac | .................... | G01V 1/325 703/6 |
| 2017/0184760 A1 * | 6/2017 | Li | ........................ | G01V 99/005 |
| 2017/0278298 A1 * | 9/2017 | Hurter | ...................... | G06T 7/11 |

* cited by examiner

*Primary Examiner* — Andrew G Yang
(74) *Attorney, Agent, or Firm* — Jones Day

(57) ABSTRACT

Systems and methods are provided for the refining and coarsening of a polyhedra mesh. The refinement includes identifying a plurality of polyhedral cells within a polyhedra mesh. A plurality of parent faces having a plurality of parent face edges are extracted for each polyhedral cell within the polyhedra mesh. For each parent face, a plurality of nodes are defined and connected either isotropically or anisotropically. A plurality of non-overlapping child faces are generated with a perimeter defined by a combination of parent face edges and child face edges. A plurality of child cells are generated from the connection of child faces of the plurality of non-overlapping child faces. Subsequent coarsening of the plurality of child cells occurs by the simultaneous agglomeration into each respective parent cell.

19 Claims, 12 Drawing Sheets

ADAPTIVE POLYHEDRA MESH REFINEMENT AND COARSENING

CROSS-REFERENCE TO RELATED APPLICATIONS

This application claims priority to U.S. Provisional Application No. 62/383,863, entitled "Adaptive Polyhedra Mesh Refinement and Coarsening," filed on Sep. 6, 2016, the entirety of which is herein incorporated by reference.

TECHNICAL FIELD

The subject matter described herein relates to adaptive refinement and coarsening of polyhedra meshes within a computer-aided modeling environment.

BACKGROUND

Computer-aided design (CAD) engineering simulation software has revolutionized fluid dynamics by automating solution tools. Computational fluid dynamics (CFD) simulations model products or objects that are sometimes impossible to gain insight into and/or measure. Thus helping to identify the physical forces and flow characteristics associated with the product or objects. As product designs and processes continue to grow in sophistication, problems involving fluid dynamics are becoming more complex.

Meshing technologies can be used in modeling a variety of physical phenomena, including solid mechanics, fluid flows, and/or electromagnetics. Polyhedral meshes can be particularly attractive for accurately representing various geometries being modeled, while also providing considerable flexibility with regard to mesh generation. Adaptive mesh refinement is a technique that can be used to achieve higher solution accuracy with a marginal increase of computational expense. Conventional mesh refinement algorithms, however, are limited to meshes with standard elements types such as hexahedra, tetrahedral, prisms, quadrilaterals, triangles, and pyramids. Moreover, existing algorithms utilize templates that are dependent upon a number of defined faces associated with each of the standard element types. For example, when a hexahedron having a defined number of six faces (each face having four edges) is passed into an algorithm, a standard template that can accommodate exactly four edges is applied for refinement. The templates, however, do not have the ability to refine arbitrary polyhedral meshes.

SUMMARY

In one aspect, a plurality of polyhedral cells within a polyhedra mesh are identified. The plurality of polyhedral cells can be identified based on a user input of a selection via a graphical user interface. Alternatively, the plurality of polyhedral cells can be identified based on marking algorithms within at least one data processor. A plurality of parent faces having a plurality of parent face edges are extracted for each polyhedral cell within the polyhedra mesh. For each parent face, a plurality of nodes are defined and connected either isotropically or anisotropically. A plurality of non-overlapping child faces are generated with a perimeter defined by a combination of parent face edges and child face edges. A plurality of child cells are generated from the connection of child faces of the plurality of non-overlapping child faces. Subsequent to being refined, the plurality of polyhedral cells can be coarsened. The refinement process can be repeated corresponding to a refinement level. Alternatively, the refinement process can be repeated corresponding to a defined maximum refinement level or minimum cell volume.

For isotopic refinement, a plurality of edge nodes can be defined. Each edge node can be located at an intersection point of two adjacent parent face edges. A plurality of mid-edge nodes can also be defined. Each mid-edge node can be located at a midpoint of two adjacent edge nodes of the parent face. The number of edges of the parent face can correspond to the plurality of mid-edge nodes. A mid-face node can be defined at the centroid of a parent face. Alternatively, a mid-face node can be defined at a location based upon a desired refinement quality.

For anisotropic refinement, a plurality of edge nodes can be such that an edge node can be located at an intersection point of two adjacent parent face edges. At least two mid-edge nodes can be defined. Each mid-edge node can be located at a midpoint of two adjacent edge nodes of the parent face. The two adjacent mid-edge nodes can be connected to create a child face edge. A plurality of nodes can include the plurality of edge nodes and the at least two mid-edge nodes.

In another aspect, a plurality of polyhedral cells can be identified within a polyhedra mesh. The plurality of polyhedral cells can be identified based on a user input of a selection via a graphical user interface. Alternatively, the plurality of polyhedral cells can be identified based on adaptation algorithms within at least one data processor. For each polyhedral cell, a plurality of parent cells can be extracted. A plurality of parent faces belonging to a common refinement level can be identified. Each parent face has a plurality of child cells with a plurality of child faces. The plurality of child faces can be simultaneously agglomerated into each respective parent face. The plurality of child cells belonging to each parent cell are agglomerated into each respective parent cell. A coarsened polyhedra mesh is generated from the agglomerated parent faces. The coarsening process can be repeated corresponding to a refinement level. Alternatively, the coarsening process can be repeated corresponding to a defined maximum refinement level or minimum cell volume.

The agglomeration can include removing all edge nodes of each child face of the plurality of child faces. All mid-edge nodes and a mid-face node of the parent face can be removed. The polyhedra mesh can be initiated for display by at least one data processor in a graphical user interface. The coarsened polyhedra mesh can be initiated for rendering by at least one data processor in the graphical user interface.

In another aspect, a non-transitory computer readable medium containing program instructions for refining a polyhedra mesh. Execution of the program instructions by at least one data processor result in operations that include identifying a plurality of polyhedral cells within a polyhedra mesh. The plurality of polyhedral cells can be identified based on a user input of a selection via a graphical user interface. Alternatively, the plurality of polyhedral cells can be identified based on marking algorithms within at least one data processor. A plurality of parent faces having a plurality of parent face edges are extracted for each polyhedral cell within the polyhedra mesh. For each parent face, a plurality of nodes are defined and connected either isotropically or anisotropically. A plurality of non-overlapping child faces are generated with a perimeter defined by a combination of parent face edges and child face edges. A plurality of child cells are generated from the connection of child faces of the plurality of non-overlapping child faces. The refinement process can be repeated corresponding to a refinement level. Alternatively, the refinement process can be repeated corresponding to a defined maximum refinement level or minimum cell volume. Subsequent to being refined, the plurality of polyhedral cells can be coarsened.

In yet another aspect, a system includes at least one data processor and memory storing instructions. Execution of the memory storing instructions by the at least one data processor results in operations for identifying a plurality of polyhedral cells within a polyhedra mesh. The plurality of polyhedral cells can be identified based on a user input of a selection via a graphical user interface. Alternatively, the plurality of polyhedral cells can be identified based on marking algorithms within at least one data processor. A plurality of parent faces having a plurality of parent face edges are extracted for each polyhedral cell within the polyhedra mesh. For each parent face, a plurality of nodes are defined and connected either isotropically or anisotropically. A plurality of non-overlapping child faces are generated with a perimeter defined by a combination of parent face edges and child face edges. A plurality of child cells are generated from the connection of child faces of the plurality of non-overlapping child faces. Subsequent to being refined, the plurality of polyhedral cells can be coarsened. The refinement process can be repeated corresponding to a refinement level. Alternatively, the refinement process can be repeated corresponding to a defined minimum cell volume. The polyhedra mesh can be initiated for display by at least one data processor in a graphical user interface. The refined polyhedra mesh can be initiated for rendering by at least one data processor in the graphical user interface.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One technical advantage includes the ability to refine and coarsen arbitrary polyhedral meshes in a CAD environment by eliminating the need for pre-defined templates. This ability provides a unified approach for mesh refinement and coarsening that is currently non-existent. These algorithms provide efficient methods of mesh refinement and coarsening regardless of the underlying cell element shapes that make up the mesh. Thus resulting in algorithms that can be universally applied to an arbitrary polyhedral meshes as opposed to specific templates being tied to various standard elements. Application of such techniques can also provide for a shorter simulation processing time.

The details of one or more variations of the subject matter described herein are set forth in the accompanying drawings and the description below. Other features and advantages of the subject matter described herein will be apparent from the description and drawings, and from the claims.

DETAILED DESCRIPTION

Within CFD simulations, objects can be modeled as meshes. Various meshing techniques exist such as tetrahedral meshing, hexahedral meshing, and/or surface meshing. A mesh can be made up of a plurality of cells having a plurality of faces. Each face being made up of a plurality of nodes. Refinement and coarsening can happen at the face and/or cell levels.

Polyhedra shapes are significantly more difficult to refine due to their arbitrary shape. The adaptation technique disclosed herein can refine and coarsen polyhedral shapes, as well as refine and coarsen standard element types including hexahedra, tetrahedra, prisms, and pyramids. Templates for refinement of standard elements do exist. However, the templates correspond to specific standard elements having a defined number of edges. No template exists for the application to an arbitrary polyhedral meshes. The adaption algorithm described herein treats the standard elements as a polyhedral. This allows for a unified adaption of all elements regardless of its element type and eliminates the need for individual templates. Mesh adaptation allows for simulations to achieve higher solution accuracy with a modest increase in computational cost.

Figure 1:
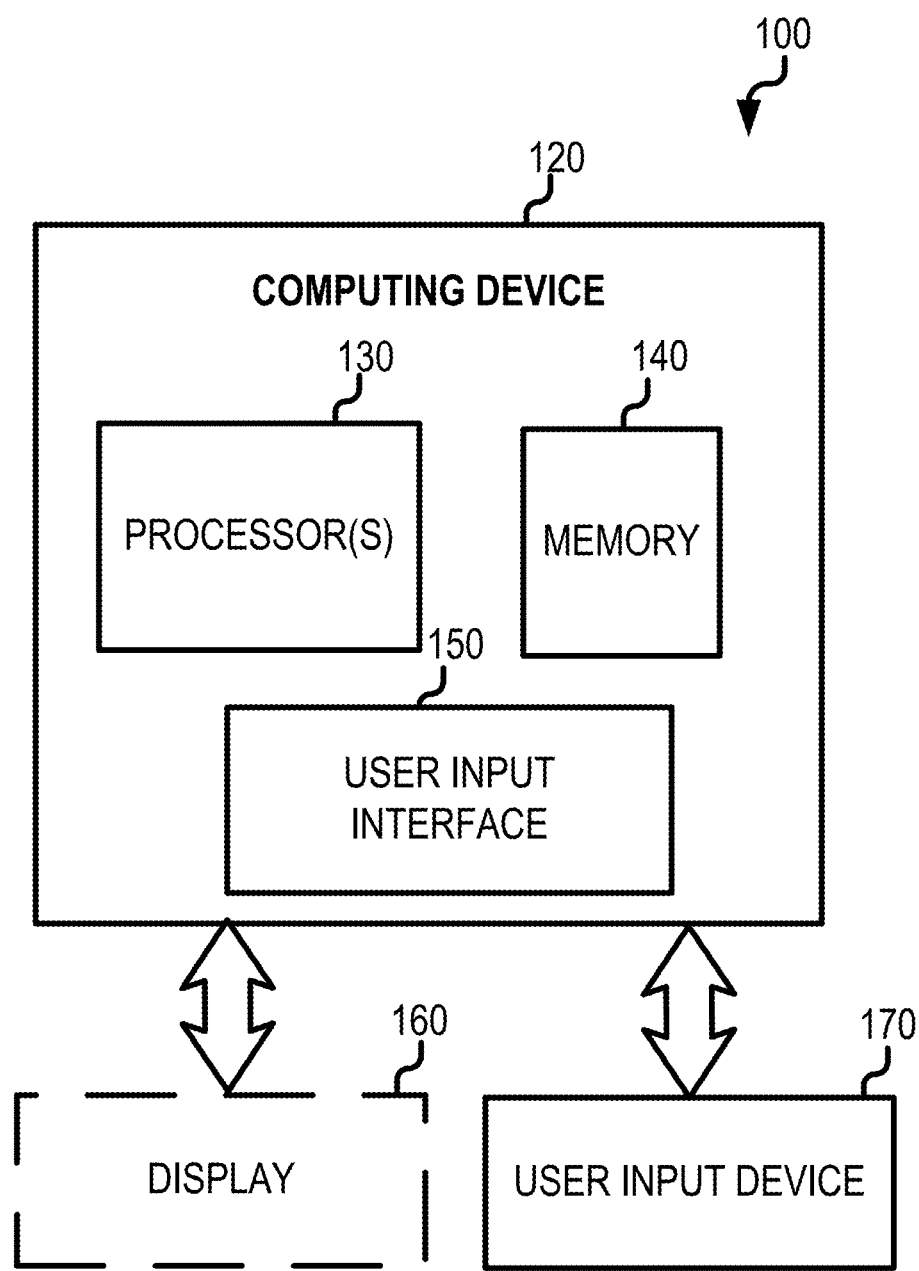
FIG. 1 is a block diagram of a system that can implement the refining and coarsening of polyhedra meshes.

FIG. 1 is a block diagram of a system 100 that can implement the refining and coarsening of polyhedra meshes. The system can include a computing device 120. The computing device 120 can include memory 140 for storing instructions for execution by one or more data processor/processor cores 130. Computing device 120 can also include a user input interface 150 that can receive instructions provided by a user input device 170 and/or via a graphical user interface. The system 100 can optionally include a display 160 that can render visual information that corresponds to a rendered polyhedra mesh of a modeled object, and/or a polyhedra mesh having a refined plurality of polyhedral cells.

Figure 2:
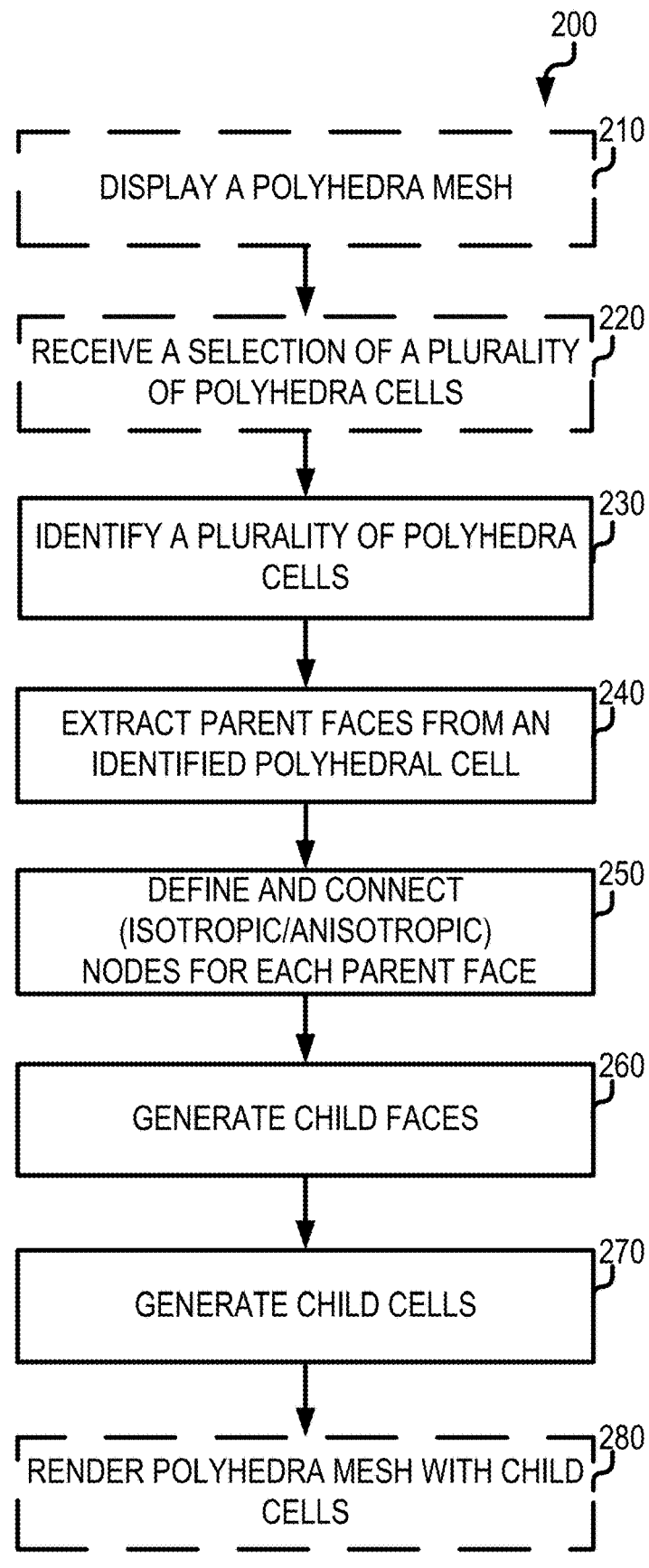
FIG. 2 is a process flow diagram illustrating a refinement algorithm.

FIG. 2 is a process flow diagram 200 illustrating a refinement algorithm. The refinement can be isotropic or anisotropic. A polyhedra mesh can be optionally displayed (block 210) on display 160. A selection of a region of cells within the polyhedra mesh for refinement can be optionally received (block 220). The refinement can be locally over a selected region or globally of the polyhedra mesh. This selection can be done through user selection via a user input device 170 and/or via a graphical user interface. Polyhedral cells can be identified within the polyhedra mesh (block 230). This can be done using a marking algorithm that would also be used with standard elements. The identified polyhedral cell can be decomposed by extracting polygon parent faces belonging to each identified individual polyhedral cell (block 240).

A plurality of nodes for each parent face can be defined and connected (block 250). The plurality of nodes can include edge nodes, mid-edge nodes, and/or mid-face nodes which can be dependent upon whether the refinement is isotropic or anisotropic. For isotropic refinement, a defined plurality of nodes can include edge nodes, mid-edge nodes, and a mid-face node. Child face edges can be defined by connecting each mid-edge node to a mid-face node. For anisotropic refinement, a defined plurality of nodes can include edge nodes and mid-edge nodes. Child face edges can be defined by connecting two adjacent mid-edge nodes. The area enclosed by the child face edges creates a child face for both isotropic and anisotropic refinement. A plurality of child faces can be generated from the plurality of nodes (block 260). A plurality of child cells can be generated from the plurality of child faces (block 270). A polyhedra mesh with a plurality of refined polyhedral cells which includes the newly generated plurality of child cells can be optionally rendered (block 280) on a display 160.

Figure 3:
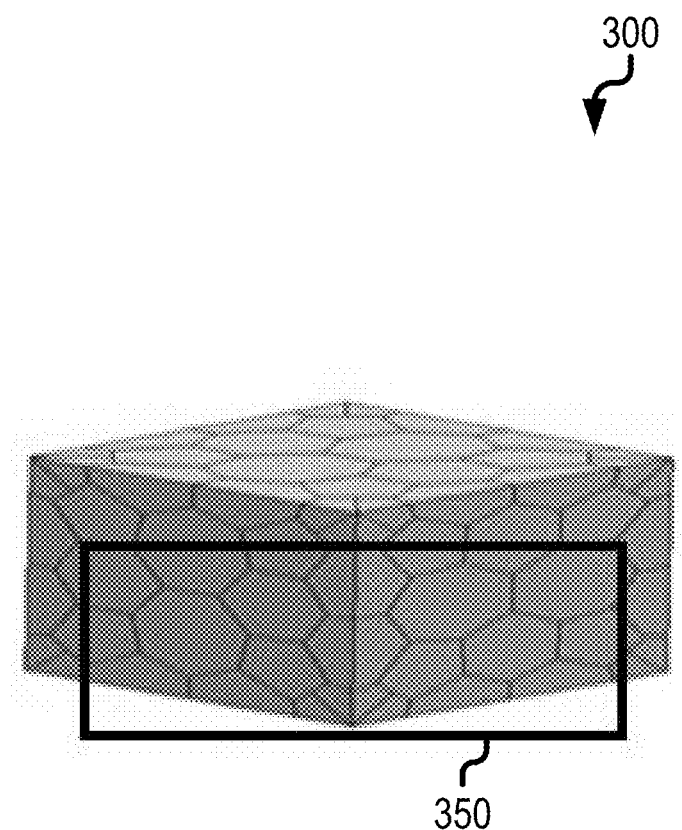
FIG. 3 is an example polyhedra mesh of a hexahedron.

FIG. 3 is an example polyhedra mesh of a hexahedron 300. A plurality of polyhedral cells 350 of polyhedral mesh 300 can be selected for refinement. This selection can be in response to a user selection via user input device 170 and/or via a graphical user interface.

Figure 4:
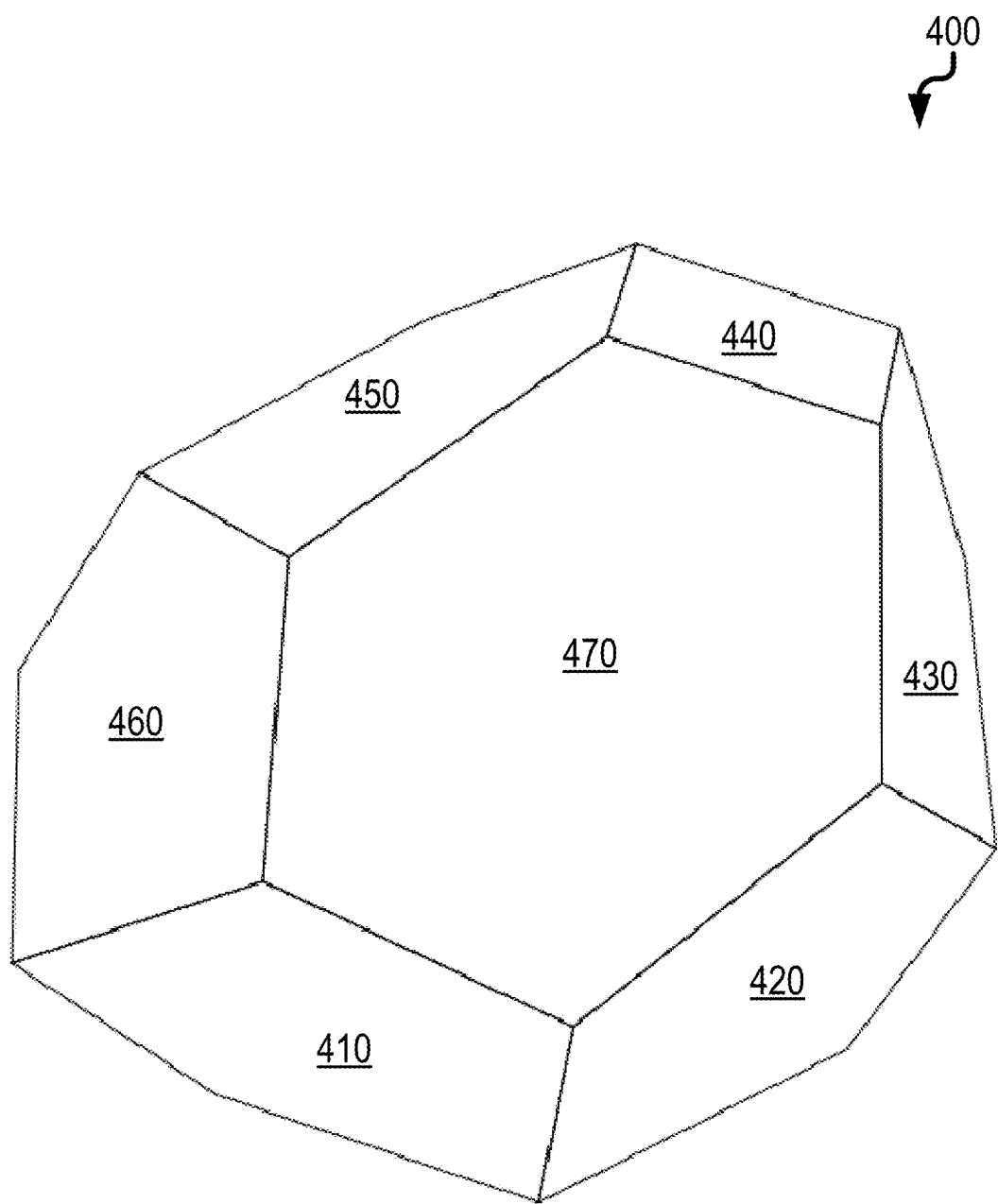
FIG. 4 is a diagrammatic depiction of polyhedra cell.

FIG. 4 is a diagrammatic depiction of a polyhedral cell 400. Polyhedral cell 400 can be one of the identified plurality of polyhedral cells 350 within polyhedra mesh 300. A plurality of parent faces 410, 420, 430, 440, 450, 460, 470 can be extracted from the identified polyhedral cell 400.

Figure 5:
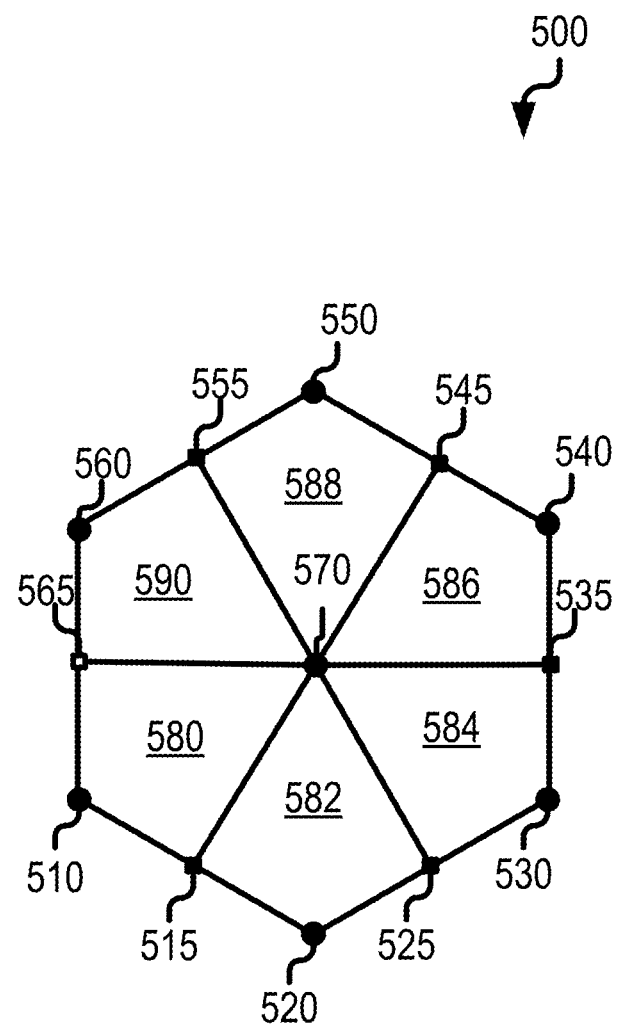
FIG. 5 is a diagrammatic depiction of a once isotropically refined polyhedral parent face.

FIG. 5 is a diagrammatic depiction of a once isotropically refined parent face 500. Parent face 500 can be equivalent to a parent face of the identified polyhedral cell 400, for example parent face 470. Edge nodes 510, 520, 530, 540, 550, and 560 can be defined at the intersection point of two adjacent edges of the parent face 500. Edge-nodes 510, 520, 530, 540, 550, and 560 belonging to parent face 500 can have a corresponding refinement level of 0. Mid-edge nodes 515, 525, 535, 545, 555, 565 can be defined corresponding to the midpoint of two adjacent edge nodes. For example, mid-edge node 515 can be located at the midpoint of two adjacent edge face nodes 510, 520. Mid-edge nodes can be enumerated in a counterclockwise order. The newly defined mid-edge nodes can be mapped to an edge node array, M{e:v}, which can return a node for every edge in the polyhedra mesh. As the defining of mid-edge nodes 515, 525, 535, 545, 555, and 565 occurs during a first refinement process these mid-edge nodes can have a corresponding refinement level of 1.

For isotropic refinement, mid-face node 570 can be defined inside parent face 500. Mid-face node 570 can be located at the centroid of parent face 500. Alternatively, mid-face node 570 can be placed in a convenient location that can be altered based on the requirements of desired mesh quality after refinement. The positioning of mid-face node 570 can be such that child faces and child cells resulting from the refinement process are not inverted. In other words, the child faces and child cells resulting from refinement based on the positioning of mid-face 570 do not have negative face area or cell volume. Mesh quality can be largely defined by the requirements of an underlying discretization method. For example, in a finite volume paradigm, the parent face normal of a resulting child face can be closely aligned with the line connecting adjacent cell centroids. Mid-face node 570 can be mapped to an array of mid-face nodes, M{f:v}, which returns a node for every face in the polyhedra mesh. Mid-face node 570 can have a refinement level of 1.

Figure 6:
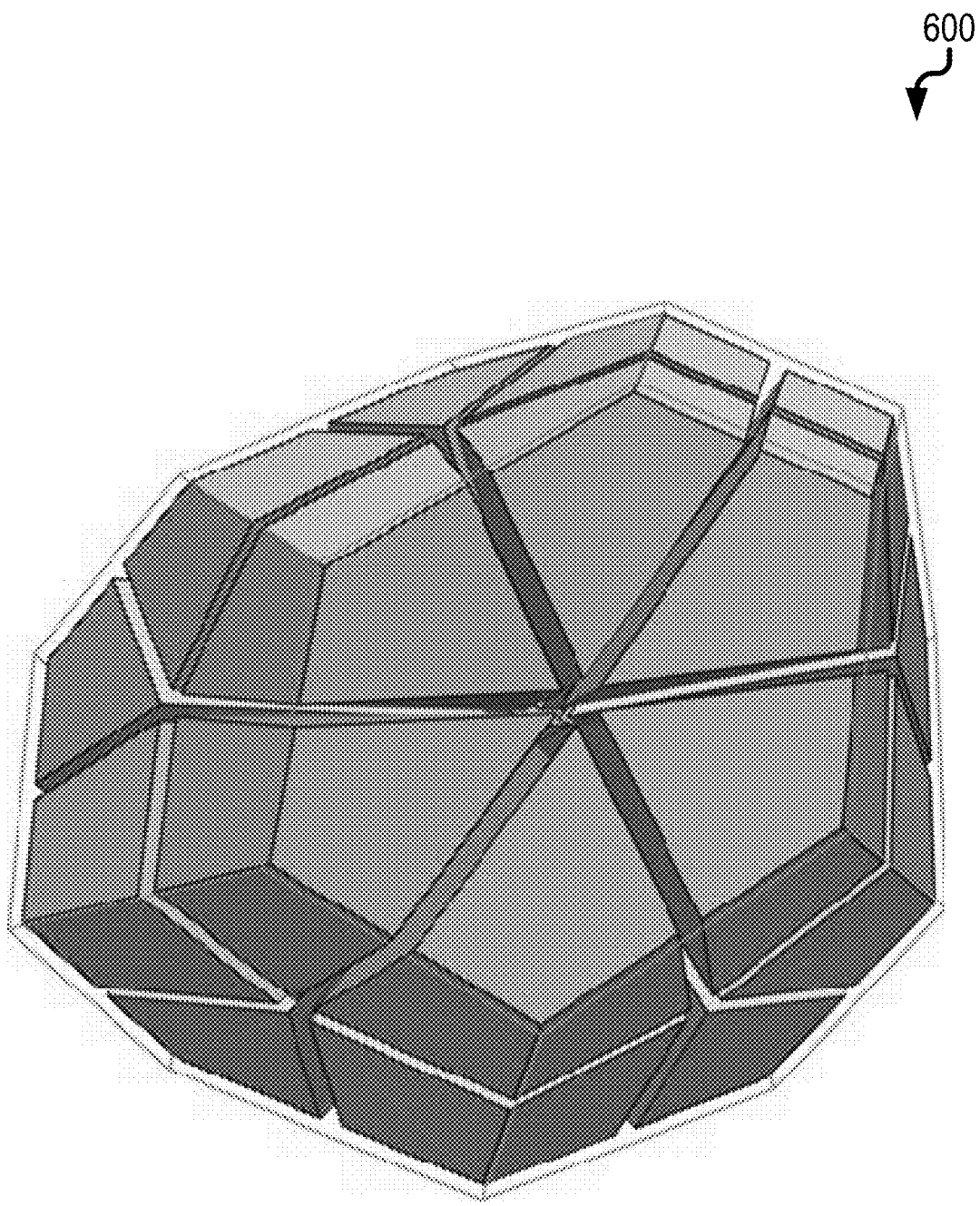
FIG. 6 is a diagrammatic depiction of a once isotropically refined polyhedra cell.

A plurality of child faces 580, 582, 584, 586, 588, 590 can be generated by defining child edges radially extending from mid-face node 570 to each of mid-edge nodes 515, 525, 535, 545, 555, 565. When isotropically refined, the number of child faces can correspond to the number of edge nodes of the parent face. For example, parent face 500 is a hexagon having six edges with six defined edge nodes 510, 520, 530, 540, 550, and 560. As a result, six child faces 580, 582, 584, 586, 588, 590 are created. This refining can occur for all parent faces corresponding to each identified polyhedral cell within the polyhedra mesh. An example of a refined polyhedra cell 600 is shown in FIG. 6.

Figure 7:
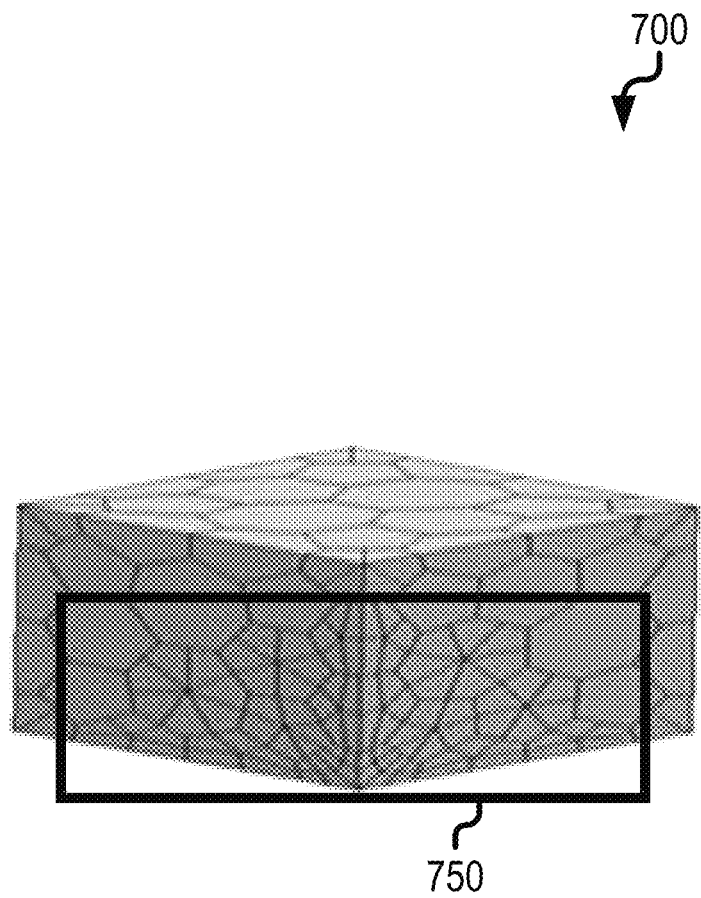
FIG. 7 is an example polyhedra mesh of a hexahedron having a once isotropically refined plurality of polyhedral cells.

FIG. 7 is a polyhedra mesh of a hexahedron 700 having a once isotropically refined plurality of cells 750. This mesh can be comprised of a plurality of refined polyhedra cells 600.

A refinement level can be a numerical value denoting the hierarchy of the refining process. This refinement level can determine the number of times the refinement algorithm is applied to a plurality of polyhedral cells. A user can define a refinement level through user input device 170 and/or via a graphical user interface. Refinement levels can be associated with mesh elements at nodes, faces, and/or cells. An unrefined polyhedra mesh can have a refinement level for the mesh elements initialized to zero.

For example, if a desired refinement level of two is set, refinement of a plurality of polyhedral cells will occur twice. The first time can occur as described in detail herein with respect to FIG. 5. After the first level of refinement, the refinement level for each node, face, and cell that was refined can be designated as an increment of the current refinement level. In this example, an unrefined face having a current face refinement level of zero will then be incremented by one. For each child face that has a corresponding refinement level of one, the refinement process can repeat. For example, after child face 580 of FIG. 5. has been refined once, it can be refined a second time after the entire refinement step is complete. For the refinement, child face 580 can be further split into child faces. The nodes, faces, and cells that had a second refinement can be incremented to have a refinement level of two. This process can continue until each of the selected cells have a refinement level that matches the user defined refinement level. A polyhedra mesh with a refined plurality of polyhedral cells can be optionally displayed on display 160 in between each refinement level.

The polyhedra mesh can also be optionally displayed on display 160 once after the refinement has reached the defined refinement level.

Alternatively, a user can define a minimum cell volume for refinement. Cells that meet this minimum cell volume can be refined using the refinement algorithm described herein.

Face refinement can be done for parent faces of the polyhedral cells identified within the polyhedra mesh. Prior to the start of refinement algorithm 200, a current face refinement level, $L_f$, and a next refinement level, $L_{f+1}$, can be defined. A previous edge node, $v_p$, a current edge node, $v_c$, and next edge node, $v_n$, can be defined by looping through all of the defined mid-edge nodes associated with a parent face being refined and evaluating associated refinement levels. If the current edge node refinement level, $L_{vc}$, is greater than the current face refinement level, $L_f$, then the current node, $v_c$, can be added to a list of nodes, $V_{face}$. If, however, the next node refinement level, $L_{vn}$, is greater than the current face refinement level, $L_f$, then all successive nodes can be looped over. Nodes having refinement levels higher than the next level of refinement, $L_{f+1}$, can be sequentially added to the list of nodes, $V_{face}$.

If the next node refinement level, $L_{vn}$, is less than or equal to the current face refinement level, $L_f$, then the existence of a mid-edge node between the current node, $v_c$, and the next node, $v_n$, can be checked. If no mid-edge node exists, then each successive edge node can be looped through and added to the list of nodes, $V_{face}$, until a mid-edge node can be found between two successive edge nodes. This mid-edge node can be added to the list of nodes, $V_{face}$. For isotropic refinement, a mid-face node, $v_{xf}$, can also be added to the list of nodes, $V_{face}$.

For isotropic refinement, a mid-face node, $v_{xf}$, can be added to the list of nodes, $V_{face}$. As a result, the list of nodes, $V_{face}$, can contain nodes ordered counterclockwise. A mid-cell node, $v_c$, can be defined at an appropriate location within the polyhedral cell being refined. Mid-cell node, $v_c$, can also be located at the centroid of the cell being refined. Mid-cell nodes can be mapped to an array of mid-cell nodes, M{c:v}, which returns a node for every cell in the polyhedra mesh.

If the previous node refinement level, $L_{vp}$, is greater than the current face refinement level, $L_f$, then all previous edge nodes can be looped through in reverse. Nodes having a refinement level higher than the next level of refinement, $L_{f+1}$, can be sequentially added to the list of nodes, $V_{face}$. If the previous node refinement level, $L_{vp}$, is less than or equal to the current face refinement level, $L_f$, then each edge node can be looped through in reverse and added to the list of nodes, $V_{face}$, until the previous node, $v_p$, is reached. This mid-edge node can be added to the list of nodes, $V_{face}$.

Cell refinement can be done across a plurality of cells within a polyhedra mesh. Prior to the start of refinement algorithm 200, a current cell refinement level, $L_c$, and next cell refinement level, $L_{c+1}$, can be defined. A mid-cell node, $v_{xc}$, can be defined for the cell being refined. Child faces corresponding to the current cell can be created by looping through all of the faces of the cell being refined corresponding face refinement levels of each face, $L_f$. Identifying whether a current face needs to be refined can be determined if the current cell refinement level, $L_c$, is equal to the face refinement level, $L_f$. The corresponding mid-face node can be obtained from the array of mid-face nodes, M{f:v}, if it exists.

A current edge node, $v_c$, and next edge node, $v_n$, can be defined by looping through all of the defined edge nodes associated with the parent face being refined. If the refinement level of the current edge node, $L_{vc}$, is greater than the current cell refinement level, $L_c$, then the next node can be processed. If the refinement level of the next node, $L_{vn}$, is less than or equal to the current cell refinement level, $L_c$, then a mid-edge node, $v_{xe}$, between two successive nodes can be found. If the next refinement level, $L_{vn}$, is greater than the next cell refinement level, $L_{c+1}$, then all successive nodes of the current face can be looped through until another node having the next cell refinement level, $L_{c+1}$, can be found. This mid-edge node can be designated as mid-edge node, $v_{xe}$.

If the next cell refinement level, $L_{c+1}$, is equal to the face refinement level, $L_f$, then it can be determined that this is a face which has already been refined by a previous operation. Thus, the mid-face node, $v_{xf}$, can be redefined as one that is common to all child faces adjacent to the current face. This can be done by obtaining three successive nodes on the face having a next cell refinement level, $L_{c+1}$. Of which, the middle node can be assigned a middle node variable, $v_{xf}$. The nodes on either side can be designated as mid-edge nodes. A child face for each refined edge of the original cell being refined can be defined by connecting the refined edge node, $v_{xe}$, mid-face node, $v_{xf}$, and mid-cell node, $v_{xc}$. Since each edge of a topologically valid cell is connected by two faces, the mid-face node, $v_{xf}$, can be configured during each loop. The mid-edge node, $v_{xe}$, and mid-cell node, $v_{xc}$, can be common to each loop.

Figure 8:
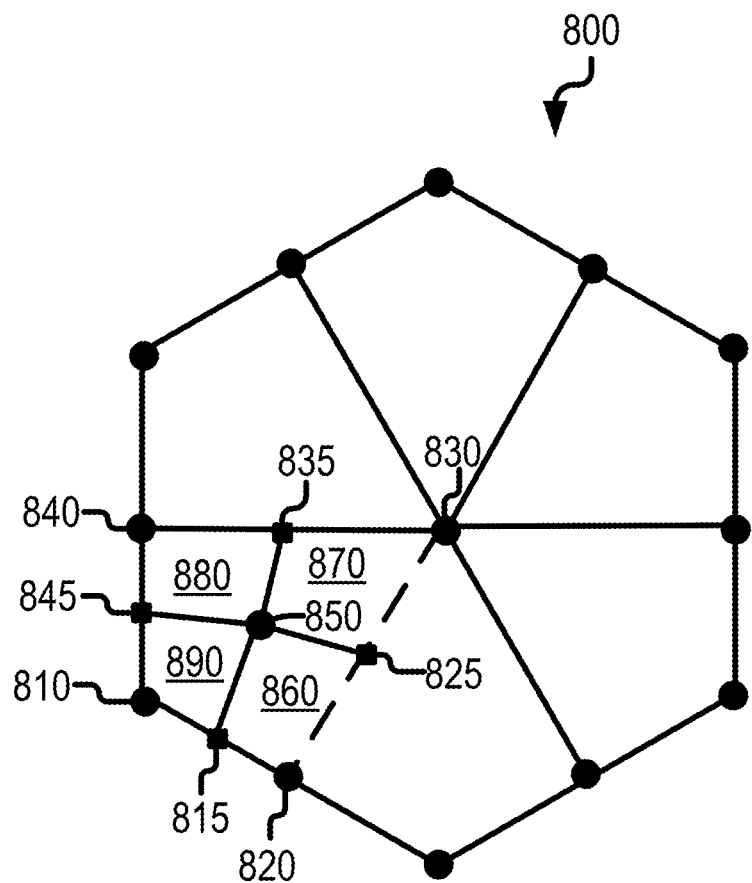
FIG. 8 is a diagrammatic depiction of a twice isotropically refined polyhedral parent face.

FIG. 8 shows a diagrammatic depiction of a twice isotropically refined parent face 800. For example, a refinement level of 2 can be set for child face 580 of FIG. 5. For this refinement, child face 580 can be split into additional child faces, thus making child 580 equivalent to a parent face. This polygon parent face can be defined by a plurality of nodes. The parent face can have edge nodes 810, 820, 830, 840. Mid-edge nodes 815, 825, 835, and 845 can be defined at the midpoint between two adjacent edge nodes. For example, mid-edge node 815 can be located at the midpoint between two adjacent edge nodes 810 and 820. Mid-face node 850 can be defined at the centroid at the face. Alternatively, mid-face node 850 can be defined a location that is convenient for alteration based on the requirements of desired mesh quality after refinement. Child face edges can be defined by radially connecting face node 850 to each of mid-edge nodes 815, 825, 835, 845. Thus creating child faces 860, 870, 880, 890.

Figure 9:
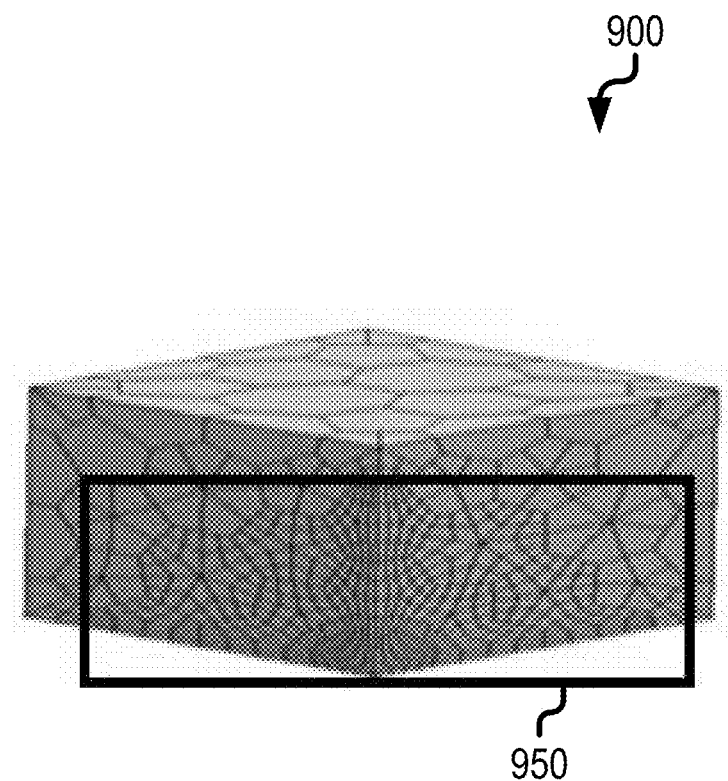
FIG. 9 is an example polyhedra mesh of a hexahedron having a twice isotropically refined plurality of polyhedral cells.

FIG. 9 is a polyhedra mesh of a hexahedron 900 having a twice isotropically refined plurality of polyhedral cells 950.

Figure 10A:
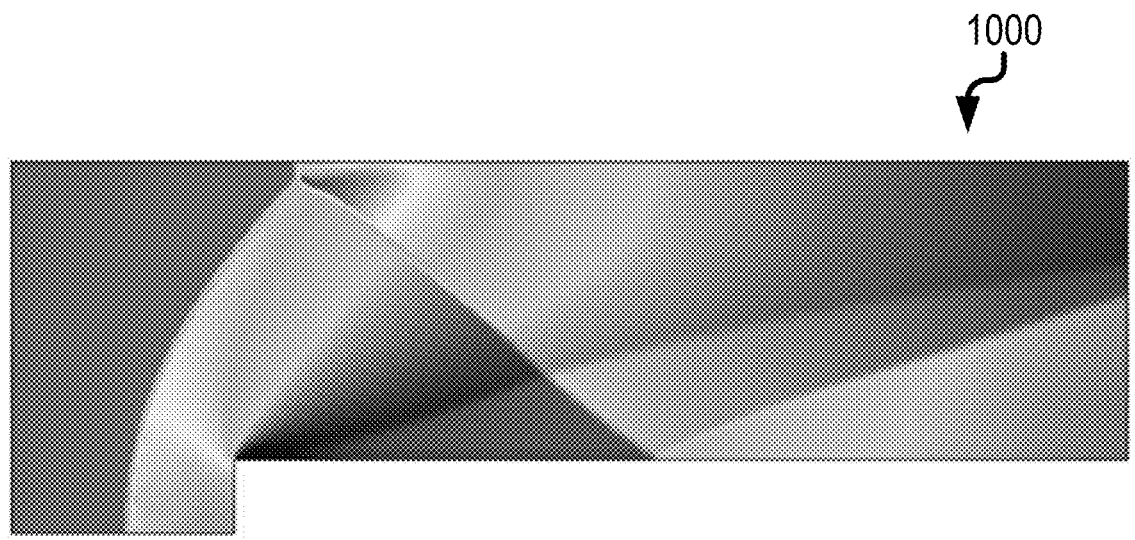
FIG. 10A is an example of a domain modeling supersonic flow.
Figure 10B:
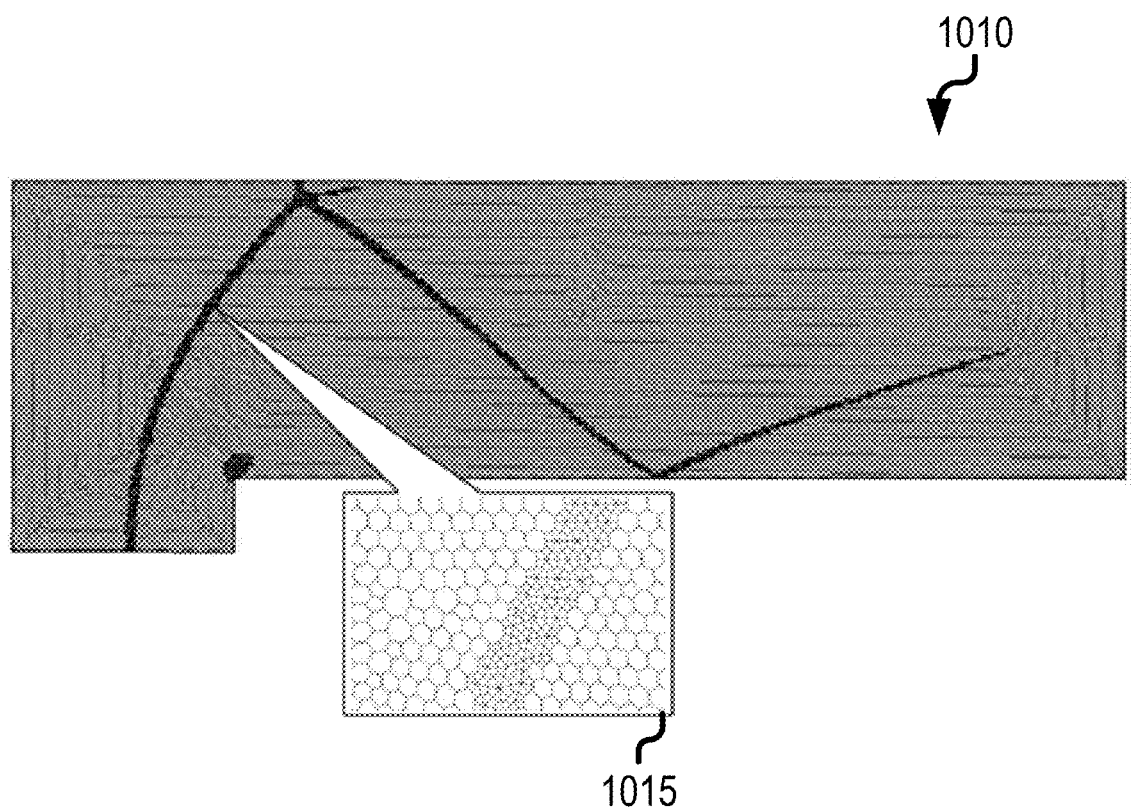
FIG. 10B is an example of a domain modeling supersonic flow isotropically refined in a forward facing step domain.

FIG. 10A is an example of a domain modeling supersonic flow 1000. FIG. 10B is an example of a domain modeling supersonic flow isotropically refined 1010 in a forward facing step domain. The domain modeling of a supersonic flow can be comprised of a plurality of cells 1015 that have been isotropically refined.

Figure 11:
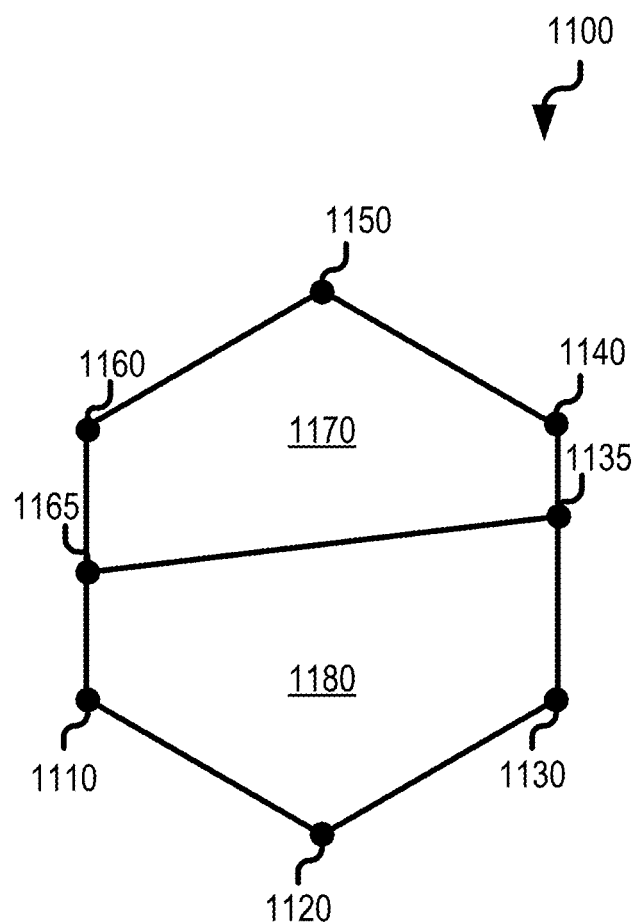
FIG. 11 is a diagrammatic depiction of a parent face once anisotropically refined.

Parent faces can also be anisotropically refined. FIG. 11 is a diagrammatic depiction of a once anisotropically refined parent face 1100. The number of child faces created as a result of anisotropic refinement can be independent of the number of edge nodes of the parent face. Edge nodes 1110, 1120, 1130, 1140, 1150, and 1160 can be defined at the points at which the edges of the parent face intersect. Mid-edge nodes 1135, 1165 can be defined at the midpoint between two adjacent edge nodes. For example, mid-edge node 1135 can be defined at the midpoint of adjacent edge nodes 1130, 1140. A child face edge can be defined by connecting adjacent mid-edge nodes 1135, 1165. The defining of a mid-face node can be skipped when during anisotropic refinement. Thus resulting in two corresponding child faces 1170, 1180.

Figure 12:
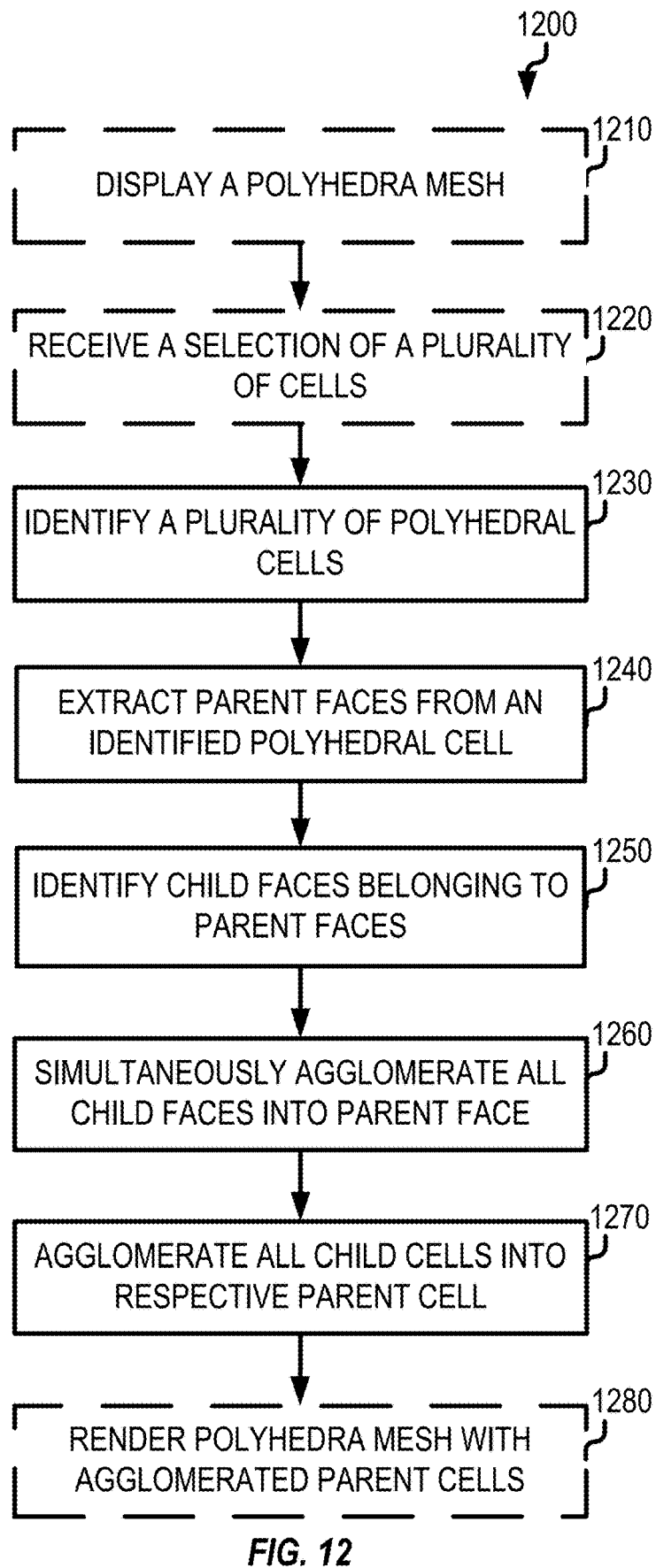
FIG. 12 is a process flow diagram illustrating a coarsening algorithm.

A coarsening algorithm can be used to revert a refined mesh back to its original mesh state. FIG. 12 is a process flow diagram 1200 illustrating a coarsening algorithm. A polyhedra mesh can be optionally displayed (block 1210) on display 160. A selection of an area of cells within the polyhedra mesh can be optionally received (block 1220). The coarsening can be locally over a plurality of polyhedral cells or globally of the polyhedra mesh if the selected plurality of polyhedral cells contain the entire polyhedra mesh. This selection can be done through user selection via a user input device 170 and/or via a graphical user interface. Polyhedral cells can be identified within the polyhedra mesh (block 1230). This can be done using a marking algorithm that handles standard elements.

Parent faces of each identified polyhedral cell can be extracted (block 1240). Child faces belonging to each parent face can be identified (block 1250). The child faces can be simultaneously agglomerated together into the parent face (block 1260) in order to recreating the original parent face corresponding to a common refinement level. The child cells can then be agglomerated into each respective parent cell (block 1270). Thus resulting in the restoration of the original parent cell corresponding to a particular refinement level prior to the refinement process being applied to that parent cell. The agglomeration of child cells can occur starting at the highest level of refinement first and repeating the process for each level of defined level of refinement. For each level of refinement, the algorithm can be repeated. The polyhedral mesh with a coarsened plurality of polyhedral cells that no longer contains child cells, i.e., a polyhedral mesh with agglomerated parent cells, can be optionally rendered on display 160 (block 1280). This image can be rendered after each refinement level coarsening. This image can also be rendered at the end of the coarsening iterations for all refinement levels.

Input data for systems and methods described herein, such as the process of FIG. 12 can be acquired via measurements from a real world apparatus (e.g. a real world machine component) or a model that is based on a real world apparatus (e.g., a model that is based on knowledge acquired based on the structure and behavior of real world machine components). Output data (e.g., a force, field quantities, mechanical field solutions, stress-strain metrics) from a simulation using a mesh as formulated herein can be utilized in a variety of downstream manners. In one embodiment, output data is compared to design threshold values to determine whether a system design meets design criteria (e.g., fault tolerances, desirable system behaviors). When the output data indicates a good design, a physical, real world apparatus may be built or adjusted based on an underlying design that resulted in the simulated output data. Such apparatus building or adjustment may be performed by a party that performed a simulation that resulted in generation of the output data, or such building or adjustment may be performed by a third party. In another example, when the output data is deemed acceptable on its own or based on further processing, a system design may be approved for incorporation into a larger system for simulation and system design.

The agglomeration of child cells can occur by looping over all of the faces of the cell being refined and identifying child faces the cells of the polyhedral mesh. These child faces can be removed first from the polyhedra mesh. Mid-edge nodes and mid-face nodes common to all child faces of a previously refined parent cell can also be removed. All remaining child faces can be added to the parent cell and thus the child cells can be deleted from the polyhedra mesh. The parent cell can be marked for additional checking in a subsequent step to determine if some/all of its faces need to be agglomerated, in addition to the possible removal of extra mid-edge nodes.

The agglomeration of child faces can also occur by looping through all of the new parent faces made during the refinement process. Faces that point to the same cell on each side can be identified. These faces can be added to a temporary list, $F_{parent}$. If the temporary list, $F_{parent}$, has a size greater than one, then a new parent face having nodes of all child faced in $F_{parent}$ can be configured. With all of the newly defined parent faces marked for additional checking. The mid-face node common to all child faces can be removed by looping over cells within the polyhedra mesh and counting the number of times each node is touched by a cell. A counter can be checked for all nodes in the polyhedral mesh. If the counter value is equal to one, then the node is no longer required and can be removed from the mesh.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method, implemented by one or more data processors forming part of at least one computing device, for refining a polyhedra mesh including a number of cells representing a portion of a physical object, the method comprising:
   identifying, by at least one data processor, a plurality of polyhedral cells within a polyhedra mesh, said refining increasing a number of cells in a representation of the portion of the physical object;
   identifying a particular polyhedral cell of the plurality of polyhedral cells, wherein the particular polyhedral cell is identified with a hierarchy position in a data structure;
   extracting, by the at least one data processor, for the particular polyhedral cell, a plurality of parent faces having a plurality of parent face edges, wherein a plurality of nodes are connected isotropically or anisotropically for each parent face;
   generating, by the at least one data processor, a plurality of non-overlapping child faces for each parent face;
   generating, by the at least one data processor, a plurality of child cells of the particular cell using the non-overlapping child faces, each child cell formed by connected child faces of the plurality of non-overlapping child faces, each of the generated child cells identified in the data structure with a hierarchy position that indicates that child cell is at a lower hierarchical level than the particular cell; and
   generating, by the at least one data processor, a refined polyhedra mesh including the generated plurality of child cells that represents the portion of the physical object, wherein the polyhedral mesh is refined by increasing the number of cells representing the portion of the physical object;
   wherein the identifying the plurality of polyhedral cells, identifying the particular polyhedral cell, extracting, and generating are repeated until a refinement level and/or a minimum cell volume is obtained.

2. The method according to claim 1, wherein the identifying the plurality of polyhedral cells is based on a user input of a selection via a graphical user interface, the selection includes the plurality of polyhedral cells.

3. The method according to claim 1, wherein the identifying the plurality of polyhedral cells is based on marking algorithms stored within the at least one data processor.

4. The method according to claim 1, wherein the plurality of nodes are connected isotropically, the method further comprising:
   defining, by at least one data processor, a plurality of edge nodes, wherein an edge node is located at an intersection point of two adjacent parent face edges;
   defining, by at least one data processor, a plurality of mid-edge nodes, wherein each mid-edge node is located at a midpoint of two adjacent edge nodes of the parent face and wherein the plurality of mid-edge nodes corresponds to a number of edges of the parent face;
   defining, by at least one data processor, a mid-face node; and
   connecting, by at least one data processor, each mid-edge node to the mid-face node, wherein the connecting creates a child face edge which radially extends from each mid-edge node to the mid-face node,
   wherein the plurality of edge nodes, the mid-face node, and the plurality of mid-edge nodes belong to the plurality of nodes.

5. The method according to claim 4, wherein the mid-face node is at the centroid of the parent face.

6. The method according to claim 4, wherein the mid-face node is at a location based upon a desired refinement quality.

7. The method according to claim 1, wherein the plurality of nodes are connected anisotropically, the method further comprising:
   defining, by at least one data processor, a plurality of edge nodes, wherein an edge node is located at an intersection point of two adjacent parent face edges;
   defining, by the at least one data processor, at least two mid-edge nodes, wherein each mid-edge node is located at a midpoint of two adjacent edge nodes of the parent face; and
   connecting, by at least one data processor, two adjacent mid-edge nodes, wherein the connecting creates a child face edge and wherein the plurality of nodes includes the plurality of edge nodes and the at least two mid-edge nodes.

8. The method according to claim 1, wherein subsequent to the refining, the plurality of polyhedral cells of the polyhedra mesh are coarsened.

9. The method according to claim 1, further comprising:
   initiating display, by at least one data processor in a graphical user interface, of the polyhedra mesh; and
   initiating rendering, by the at least one data processor in the graphical user interface, of the refined polyhedra mesh having the plurality of child cells.

10. The method of claim 1, wherein the polyhedral mesh is representative of a physical system that exists or is being designed.

11. The method of claim 1, further comprising performing a simulation using the refined polyhedral mesh, wherein data characterizing simulated physical phenomena is used to build a component of a physical system or to modify an existing physical component.

12. The method according to claim 1, wherein each polyhedral cell within the plurality of polyhedral cells has an arbitrary shape, and wherein the refined mesh represents a selected region of the polyhedral mesh.

13. A method, implemented by one or more data processors forming part of at least one computing device, for modifying a polyhedral mesh including a number of cells representing a portion of a physical object, the method comprising:
  identifying, by at least one data processor, a plurality of polyhedral cells within a polyhedra mesh to combine, said combining decreasing a number of cells in the representation of the physical object;
  extracting, by the at least one data processor, a plurality of parent faces of a parent cell for the plurality of polyhedral cells, the parent faces having a common refinement level;
  identifying, by the at least one data processor, a plurality of child faces for each parent face, wherein a plurality of child cells of non-overlapping child faces are formed by connected child faces of the non-overlapping child faces, wherein each child cell is identified within a hierarchy position in a data structure;
  agglomerating, simultaneously, by the at least one data processor, the plurality of child faces into each respective parent face;
  agglomerating, by the at least one data processor, the plurality of child cells into the parent cell; and
  generating, by the at least one data processor, a coarsened polyhedra mesh including the agglomerated plurality of child cells, wherein the polyhedral mesh is coarsened by decreasing the number of cells representing the portion of the physical object;
  wherein the identifying, extracting, and agglomerating are repeated until a refinement level and/or a minimum cell volume is obtained.

14. The method according to claim 13, wherein the agglomerating comprises:
  removing, by the at least one data processor, all edge nodes of each child face of the plurality of child faces; and
  removing, by the at least one data processor, all mid-edge nodes and a mid-face node of the parent face defined during refinement.

15. The method according to claim 13, further comprising:
  displaying, by at least one data processor in a graphical user interface, the polyhedra mesh; and
  rendering, by the at least one data processor in the graphical user interface, a coarsened area of the polyhedra mesh having the agglomerated plurality of child cells.

16. The method of claim 13, wherein the polyhedral mesh is representative of a physical system that exists or is being designed.

17. The method of claim 13, further comprising performing a simulation using the refined polyhedral mesh, wherein data characterizing simulated physical phenomena is used to build a component of a physical system or to modify an existing physical component.

18. A non-transitory computer readable medium containing program instructions for refining a polyhedra mesh including a number of cells representing a portion of a physical object, wherein execution of the program instructions by one or more processors of a computer system causes one or more processors to carry out the steps of:
  identifying, by at least one data processor, a plurality of polyhedral cells within a polyhedra mesh to refine, said refining increasing a number of cells in a representation of the portion of the physical object;
  identifying a particular polyhedral cell and storing an identification of the particular polyhedral cell and a hierarchy position of the particular cell in a data structure;
  extracting, by the at least one data processor, for the particular polyhedral cell within the plurality of polyhedral cells, a plurality of parent faces having a plurality of parent face edges, wherein a plurality of nodes are connected isotropically or anisotropically for each parent face;
  generating, by the at least one data processor, a plurality of non-overlapping child faces for each parent face;
  generating, by the at least one data processor, a plurality of child cells of the particular cell using the non-overlapping child faces, each child cell being formed by connected child faces of the plurality of non-overlapping child faces, each of the generated child cells being identified in the data structure with a hierarchy position that indicates that child cell is at a lower hierarchical level than the particular cell; and
  generating, by the at least one data processor, a refined polyhedra mesh including the generated plurality of child cells that represents the portion of the physical object;
  wherein the identifying the plurality of polyhedral cells, identifying the particular polyhedral cell, extracting, and generating are repeated until a refinement level and/or a minimum cell volume is obtained.

19. A system for polyhedra mesh refinement that operates on a polyhedral mesh including a number of cells representing a portion of a physical object, the system comprising:
  at least one data processor; and
  memory storing instructions which, when executed by the at least one data processor, result in operations comprising:
    identifying, by at least one data processor, a plurality of polyhedral cells within a polyhedra mesh to refine, said refining increasing a number of cells in a representation of the portion of the physical object;
    identifying a particular polyhedral cell and storing an identification of the particular polyhedral cell and a hierarchy position of the particular cell in a data structure;
    extracting, by the at least one data processor, for the particular polyhedral cell within the plurality of polyhedral cells, a plurality of parent faces having a plurality of parent face edges, wherein a plurality of nodes are connected isotropically or anisotropically for each parent face;
    generating, by the at least one data processor, a plurality of non-overlapping child faces for each parent face;
    generating, by the at least one data processor, a plurality of child cells of the particular cell using the non-overlapping child faces, each child cell being formed by connected child faces of the plurality of non-overlapping child faces, each of the generated child cells being identified in the data structure with a hierarchy position that indicates that child cell is at a lower hierarchical level than the particular cell; and generating, by the at least one data processor, a refined polyhedra mesh including the generated plurality of child cells that represents the portion of the physical object;

wherein the identifying the plurality of polyhedral cells, identifying the particular polyhedral cell, extracting, and generating are repeated until a refinement level and/or a minimum cell volume is obtained.

* * * * *